United States Patent
Goto

(10) Patent No.: US 9,302,535 B2
(45) Date of Patent: Apr. 5, 2016

(54) AUTOMOBILE WHEEL

(75) Inventor: Yoshifumi Goto, Toyota (JP)

(73) Assignee: Central Motor Wheel Co., Ltd., Anjo-Shi (JP)

(*) Notice: Subject to any disclaimer, the term of this patent is extended or adjusted under 35 U.S.C. 154(b) by 19 days.

(21) Appl. No.: 14/386,091

(22) PCT Filed: Apr. 24, 2012

(86) PCT No.: PCT/JP2012/060926
§ 371 (c)(1),
(2), (4) Date: Sep. 18, 2014

(87) PCT Pub. No.: WO2013/160997
PCT Pub. Date: Oct. 31, 2013

(65) Prior Publication Data
US 2015/0042150 A1   Feb. 12, 2015

(51) Int. Cl.
| | |
|---|---|
| B60B 3/12 | (2006.01) |
| B60B 3/04 | (2006.01) |
| B60B 3/00 | (2006.01) |
| B60B 3/02 | (2006.01) |

(Continued)

(52) U.S. Cl.
CPC . B60B 3/12 (2013.01); B60B 3/004 (2013.01); B60B 3/005 (2013.01); B60B 3/007 (2013.01); B60B 3/02 (2013.01); B60B 3/041 (2013.01); B60B 1/10 (2013.01); B60B 3/10 (2013.01); B60B 2900/311 (2013.01); B60Y 2200/10 (2013.01)

(58) Field of Classification Search
CPC .............. B60B 3/12; B60B 3/02; B60B 3/06; B60B 3/004; B60B 3/005; B60B 3/041; B60B 3/007; B60B 3/10; B60B 2900/311; B60B 1/06; B60B 1/08

USPC .............. 301/6.1, 6.8, 62, 65, 66, 79, 63.101, 301/63.103, 63.104, 63.106, 63.107, 301/63.108, 64.101, 64.704
See application file for complete search history.

(56) References Cited

U.S. PATENT DOCUMENTS

| | | |
|---|---|---|
| 5,360,261 A | 11/1994 | Archibald et al. |
| 5,538,329 A | 7/1996 | Stach |

(Continued)

FOREIGN PATENT DOCUMENTS

| | | |
|---|---|---|
| JP | 03-169701 A1 | 7/1991 |
| JP | 05-246201 A1 | 9/1993 |

(Continued)

OTHER PUBLICATIONS

International Search Report and Written Opinion (Application No. PCT/JP2012/060926) dated Jul. 24, 2012.

*Primary Examiner* — S. Joseph Morano
*Assistant Examiner* — Jean Charleston
(74) *Attorney, Agent, or Firm* — Burr & Brown, PLLC

(57) ABSTRACT

Each spoke portion includes spoke projecting threads on both sides thereof, and a reinforcing plate portion is formed so as to protrude from a side edge of each of the spoke projecting threads outward in a spoke widthwise direction. The reinforcing plate portion is formed continuously with an inter-spoke plate portion extended from a fitting portion of a disc flange portion to a wheel radially inner side, and forms an integral plate surface with the inter-spoke plate portion. With this configuration, it is possible to reduce imbalance of rigidity of the spoke portion in a radial direction, and to increase rigidity of an automobile wheel.

12 Claims, 10 Drawing Sheets

(51) Int. Cl.
*B60B 1/10* (2006.01)
*B60B 3/10* (2006.01)

(56) References Cited

U.S. PATENT DOCUMENTS

| | | |
|---|---|---|
| 2003/0178887 A1 | 9/2003 | de A. Sereno |
| 2005/0006945 A1 | 1/2005 | Alff et al. |
| 2005/0017570 A1 | 1/2005 | Alff et al. |
| 2010/0253134 A1 | 10/2010 | Sano et al. |
| 2010/0314932 A1* | 12/2010 | Fukaya .................. B60B 3/002 301/63.101 |
| 2011/0193405 A1* | 8/2011 | Kihara .................. B60B 3/007 301/64.102 |
| 2011/0210602 A1 | 9/2011 | Goto |
| 2012/0217792 A1 | 8/2012 | Nakayama et al. |

FOREIGN PATENT DOCUMENTS

| | | |
|---|---|---|
| JP | 2004-001704 A1 | 1/2004 |
| JP | 2005-509552 A1 | 4/2005 |
| JP | 2005-511371 A1 | 4/2005 |
| WO | 2009/051230 A1 | 4/2009 |
| WO | 2010/053150 A1 | 5/2010 |
| WO | 2011/055839 A1 | 5/2011 |
| WO | 2011/074065 A1 | 6/2011 |

\* cited by examiner (B-B CROSS-SECTION)   (C-C CROSS-SECTION)   (D-D CROSS-SECTION)

(a)                   (b)                    (c)

AUTOMOBILE WHEEL

TECHNICAL FIELD

The present invention relates to an automobile wheel formed by joining a wheel disc and a wheel rim together.

BACKGROUND ART

Hitherto, a two-piece type automobile wheel including a wheel disc and a wheel rim is integrally formed in such a manner that an outer peripheral surface of a disc flange portion formed on an outer periphery of the wheel disc is fitted and welded on an inner peripheral surface of the wheel rim. As the above-mentioned automobile wheel, as proposed in, for example, Patent Literature 1, there has been known an automobile wheel having a plurality of spokes formed in the wheel disc. In the wheel disc of the automobile wheel, the plurality of spoke portions are extended equiangularly to a wheel radially outer side from an outer peripheral edge of a hub mounting portion to be coupled to a hub of an axle, and the plurality of spoke portions couple the hub mounting portion and the disc flange portion together. With this configuration, in the wheel disc, there are formed substantially triangular openings (ornamental holes) each being surrounded by the adjacent spoke portions, the disc flange portion, and the hub mounting portion.

In the automobile wheel proposed in Patent Literature 1, side edge portions formed on both sides of each of the spoke portions in a widthwise direction are bent into an L-shape in cross-section. Further, a coupling portion for continuously coupling the side edge portions of the adjacent spoke portions is formed on an outer periphery of the hub mounting portion.

Further, the disc flange portion of the wheel disc includes an annular fitting portion to be fitted on an inner peripheral surface of a well portion of the wheel rim, and circular-arc plate portions each having a predetermined width and being extended from the fitting portion at a position between the adjacent spoke portions so as to be bent to a wheel radially inner side. Each of the circular-arc plate portions is formed so as to be dented to a back side with respect to an outer end of the side edge portion formed on each side of the spoke portion, and is integrally coupled to the outer end of the side edge portion in a stepped manner.

CITATION LIST

Patent Literature

[PTL 1] WO 2011/074065 A1

SUMMARY OF INVENTION

However, the automobile wheel proposed in Patent Literature 1 has room for improvement in view of rigidity balance. In the automobile wheel, the side edge portion formed on each side of the spoke portion is coupled to the coupling portion at the hub mounting portion, and hence the side edge portion and the coupling portion integrally function as a reinforcing portion. Therefore, on a proximal end side (side close to the hub mounting portion) of the spoke portion, high rigidity can be obtained. Meanwhile, on a distal end side (side close to the disc flange portion) of the spoke portion, the outer end of the side edge portion of the spoke portion is coupled to the circular-arc plate portion of the disc flange portion, but the circular-arc plate portion of the disc flange portion is formed so as to be dented to the back side with respect to the outer end of the side edge portion. Accordingly, deformation easily occurs in a stepped portion in which the side edge portion and the circular-arc plate portion are integrally coupled together. Thus, on the distal end side of the spoke portion, rigidity is reduced as compared to the proximal end side. As a result, the automobile wheel cannot attain high rigidity.

The present invention has been made in order to solve the above-mentioned problem, and has an object to reduce imbalance of rigidity of spoke portions in a radial direction, to thereby increase rigidity of the automobile wheel.

In order to achieve the above-mentioned object, the feature of the present invention resides in an automobile wheel, including:

a wheel rim (10) for supporting beads of a tire; and
a wheel disc including:
 a hub mounting portion (40) to be coupled to a hub of an axle;
 a disc flange portion (30) connected to an inner peripheral surface of the wheel rim; and
 a plurality of spoke portions (50) extended from the hub mounting portion to a wheel radially outer side so as to couple the hub mounting portion and the disc flange portion together,
the hub mounting portion, the disc flange portion, and the plurality of spoke portions being formed integrally with each other,
the wheel disc having openings (60) each being surrounded by adjacent spoke portions among the plurality of spoke portions, the disc flange portion, and the hub mounting portion,
each of the plurality of spoke portions (50) including:
 a center groove bottom portion (51) formed at a center position of the each of the plurality of spoke portions in a spoke widthwise direction so as to extend in a wheel radial direction; and
 spoke projecting threads (52) arranged side by side on both sides of the center groove bottom portion in the spoke widthwise direction, each of the spoke projecting threads being curved and formed so that a cross-section thereof in the spoke widthwise direction projects to a wheel axially front side in a mountain shape,
the hub mounting portion (40) including spoke projecting thread coupling portions (43) each configured to couple together the spoke projecting threads, which face each other across each of the openings between the adjacent spoke portions, in a U-shaped manner when viewed from a wheel axial direction,
the disc flange portion (30) including:
 a fitting portion (31) fitted on the inner peripheral surface of the wheel rim and coupled to distal ends of the plurality of spoke portions; and
 inter-spoke plate portions (32) each having a concentric circular-arc shape, each of the inter-spoke plate portions being formed between the adjacent spoke portions by bending a front end of the fitting portion in the wheel axial direction to a wheel radially inner side,
an outer edge of the each of the spoke projecting threads in the spoke widthwise direction of the each of the plurality of spoke portions (50) being bent outward in the spoke widthwise direction so that the each of the spoke projecting threads and the each of the inter-spoke plate portions are coupled together on a distal end side of the each of the plurality of spoke portions,
the each of the plurality of spoke portions (50) further including a reinforcing plate portion (53) formed in a region from a portion coupled to the each of the inter-spoke plate portions to a proximal end side of the each of the plurality of spoke portions so as to protrude toward the each of the openings from the outer edge of the each of the spoke projecting threads in the spoke widthwise direction, the reinforcing plate portion (53) being formed into a plate surface continuous with the each of the inter-spoke plate portions, and a length of the reinforcing plate portion (53), which protrudes toward the each of the openings outward in the spoke widthwise direction, becoming smaller toward the proximal end side of the each of the plurality of spoke portions.

The automobile wheel according to the present invention includes the wheel rim and the wheel disc, and is integrally formed in such a manner that the disc flange portion of the wheel disc is connected to the inner peripheral surface of the wheel rim. The wheel disc includes the plurality of spoke portions that are extended from the hub mounting portion to the wheel radially outer side so as to couple the hub mounting portion and the disc flange portion together. With this configuration, in the wheel disc, the openings each surrounded by the adjacent spoke portions, the disc flange portion, and the hub mounting portion are formed.

Each of the spoke portions includes the center groove bottom portion formed at the center position in the spoke widthwise direction so as to extend in the wheel radial direction; and the spoke projecting threads, which are arranged side by side on the both sides of the center groove bottom portion in the spoke widthwise direction and are curved and formed so that the cross-section thereof in the spoke widthwise direction projects to the wheel axially front side (front side of the wheel in the wheel axial direction) in a mountain shape. In this case, the spoke projecting threads are formed so as to have the mountain shape in cross-section in the spoke widthwise direction. Accordingly, on the outer side in the spoke widthwise direction with respect to the top of each spoke projecting thread, a side wall surface (downward-inclining wall surface) extending from the top to the wheel axially back side is formed. This shape increases rigidity of the spoke portions. Note that, the cross-section in the spoke widthwise direction refers to a cross-section cut along a plane that is directed in a widthwise direction (widthwise direction orthogonal to a spoke axis) of each of the spoke portions and is parallel to a wheel axis.

The hub mounting portion includes the spoke projecting thread coupling portion, and the spoke projecting thread coupling portion couples the spoke projecting threads, which face each other across the opening, in a U-shaped manner when viewed from the wheel axial direction (in front view). This shape increases rigidity of the spoke portions and the hub mounting portion.

At the fitting portion, the disc flange portion is fitted on the inner peripheral surface of the wheel rim, and is coupled to the distal ends of the spoke portions. In the fitting portion, a portion of a front end of the fitting portion in the wheel axial direction, which is not coupled to each of the spoke portions, is bent and extended to the wheel radially inner side. With this configuration, the inter-spoke plate portion having a concentric circular-arc shape is formed between the adjacent spoke portions by extending and bending the fitting portion to the wheel radially inner side.

In each spoke portion, the outer edge of each spoke projecting thread in the spoke widthwise direction is bent outward in the spoke widthwise direction. Thus, the spoke projecting thread and the inter-spoke plate portion are coupled together on the distal end side of the spoke portion, and the reinforcing plate portion is formed in a region from the portion coupled to the inter-spoke plate portion to the proximal end side (proximal end side of the spoke portion) so as to protrude toward the opening from the outer edge of the spoke projecting thread in the spoke widthwise direction. The reinforcing plate portion is formed into a plate surface continuous with the inter-spoke plate portion. Further, the reinforcing plate portion and the inter-spoke plate portion form a continuous plate surface at a position on the wheel axially back side with respect to the top of the spoke projecting thread. With this configuration, the spoke portion and the inter-spoke plate portion are coupled extremely firmly. As a result, the coupling portion (bent portion) between the spoke portion and the inter-spoke plate portion is less likely to be deformed.

Further, a length of the reinforcing plate portion, which protrudes toward the opening outward in the spoke widthwise direction, becomes smaller toward the proximal end side of each of the spoke portions. In each of the spoke portions, the spoke projecting threads are coupled by the spoke projecting thread coupling portion on the proximal end side, and hence satisfactory rigidity can be obtained on the proximal end side. Therefore, according to the present invention, the protruding length of the reinforcing plate portion is set to become smaller toward the proximal end side of each of the spoke portions. With this configuration, cooling performance of a braking device can be maintained by preventing the area of the opening from being narrowed to the extent possible, and rigidity of the distal end side of each of the spoke portions can be increased. As a result, according to the present invention, imbalance of rigidity of the spoke portions in the radial direction is reduced, and thus rigidity of the automobile wheel can be increased.

Further, another feature of the present invention resides in that the reinforcing plate portion (53) is formed on the distal end side with respect to an intermediate position of the each of the plurality of spoke portions in a radial direction.

According to the present invention, further excellent rigidity balance in the radial direction of the spoke portions can be obtained.

Further, another feature of the present invention resides in that the spoke projecting threads (52) arranged side by side on the both sides of the center groove bottom portion (51) are formed so as to approach each other toward the distal end side of the each of the plurality of spoke portions.

According to the present invention, the length of the reinforcing plate portion, which protrudes toward the opening outward in the spoke widthwise direction, becomes larger toward the distal end side of each spoke portion, but a separation distance between the two spoke projecting threads arranged side by side on the both sides of the center groove bottom portion becomes smaller toward the distal end side of the spoke portion. This can prevent a spoke width from becoming wider toward the distal end side. Therefore, it is possible to increase rigidity of the automobile wheel while maintaining excellent design quality.

Further, another feature of the present invention resides in that the each of the spoke projecting threads (52) includes: an inner curved surface portion (52a) bent to the wheel axially front side from an end of the center groove bottom portion in the spoke widthwise direction so as to incline upward; and an outer curved surface portion (52b) formed continuously with the inner curved surface portion so as to incline downward to a wheel axially back side, the each of the spoke projecting threads being curved and formed by the inner curved surface portion and the outer curved surface portion so that the cross-section thereof in the spoke widthwise direction projects to the wheel axially front side in the mountain shape, that the outer curved surface portion is cut out on the proximal end side of the each of the plurality of spoke portions, and that each of the spoke projecting thread coupling portions (43)

couples together the inner curved surface portion (52a) of one of the spoke projecting threads and the inner curved surface portion (52a) of another one of the spoke projecting threads.

According to the present invention, each of the spoke projecting threads includes the inner curved surface portion bent to the wheel axially front side from the end of the center groove bottom portion in the spoke widthwise direction so as to incline upward, and the outer curved surface portion formed continuously with the inner curved surface portion so as to incline downward to the wheel axially back side, and thus each of the spoke projecting threads is curved and formed so that the cross-section thereof in the spoke widthwise direction projects to the wheel axially front side in a mountain shape. Further, in each of the spoke projecting threads, the outer curved surface portion is cut out on the proximal end side of each of the spoke portions, and the spoke projecting thread coupling portion couples together the inner curved surface portions of the spoke projecting threads that face each other across the opening. Therefore, according to the present invention, the opening can be widened by cutting out the proximal end side of each of the spoke portions by an area corresponding to the outer curved surface portions, and further excellent rigidity balance in the radial direction of the spoke portions can be obtained.

Further, another feature of the present invention resides in that the outer curved surface portion (52b) includes a cutout (52c) formed by cutting out a side edge of the outer curved surface portion so as to become wider toward the proximal end side of the each of the plurality of spoke portions, and that the reinforcing plate portion (53) is formed so as to protrude toward the each of the openings outward in the spoke widthwise direction from the side edge of the outer curved surface portion, which is positioned on the distal end side including no cutout.

According to the present invention, the cutout is formed in the side edge of the outer curved surface portion so as to become wider toward the proximal end side of each spoke portion, and no cutout is formed on the distal end side of the spoke portion. The reinforcing plate portion is formed so as to protrude toward the opening outward in the spoke widthwise direction from the side edge of the outer curved surface portion, which is positioned on the distal end side including no cutout. Further, the protruding length of the reinforcing plate portion becomes larger toward the distal end side of the spoke portion. Thus, rigidity of the distal end side of the spoke portion can be increased, and further excellent rigidity balance in the radial direction of the spoke portion can be obtained. In addition, the outer edges of the spoke projecting threads facing the opening can be formed into a smooth continuous shape.

Note that, in the above description, in order to help understanding of the present invention, reference symbols used in the following embodiment are added in parentheses to components of the invention corresponding to components described in the embodiment, but the respective components of the invention are not limited to those of the embodiment designated by the reference symbols.

DESCRIPTION OF EMBODIMENT

Figure 1:
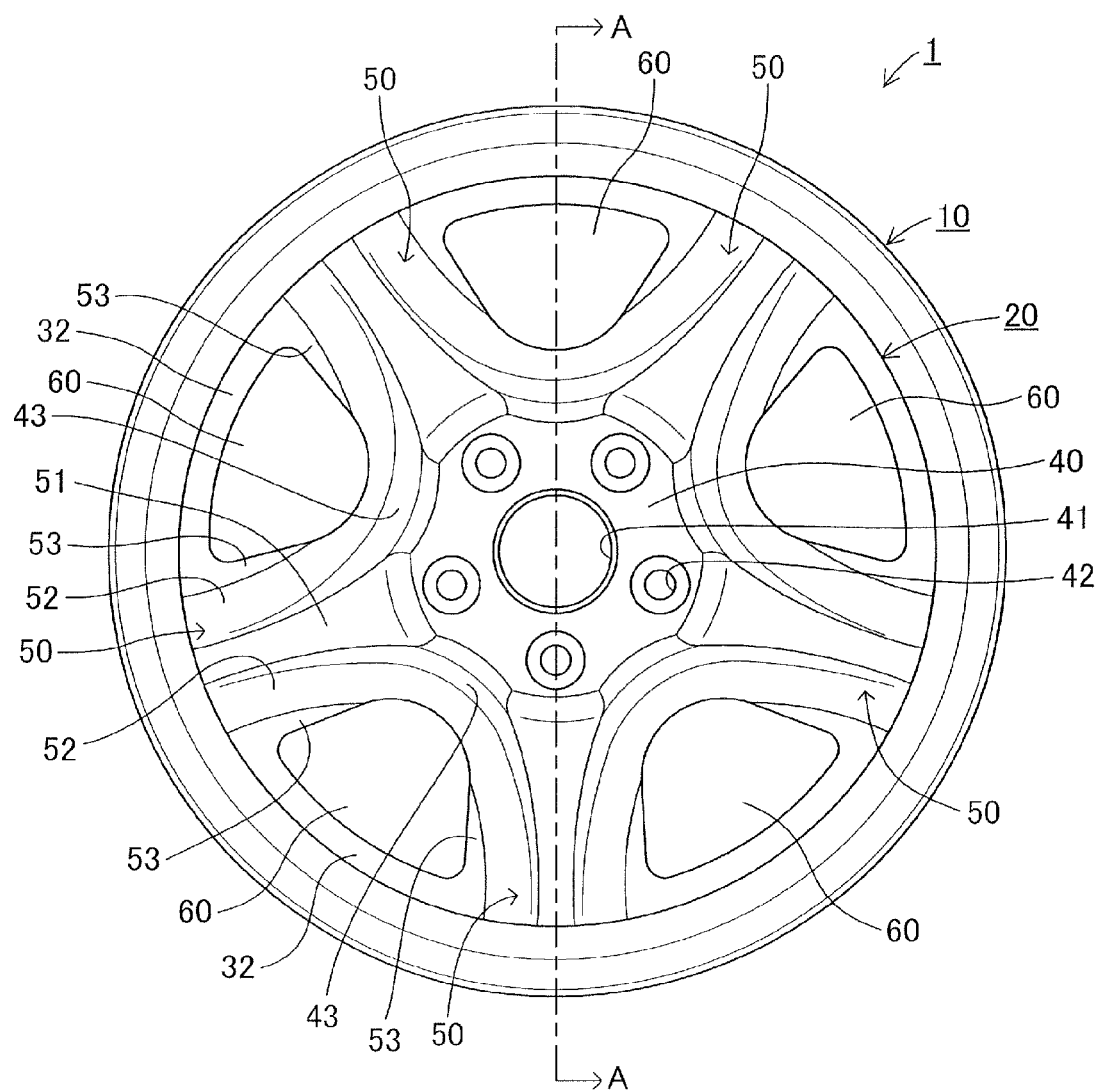
FIG. 1 is a front view of an automobile wheel according to an embodiment of the present invention.
Figure 2:
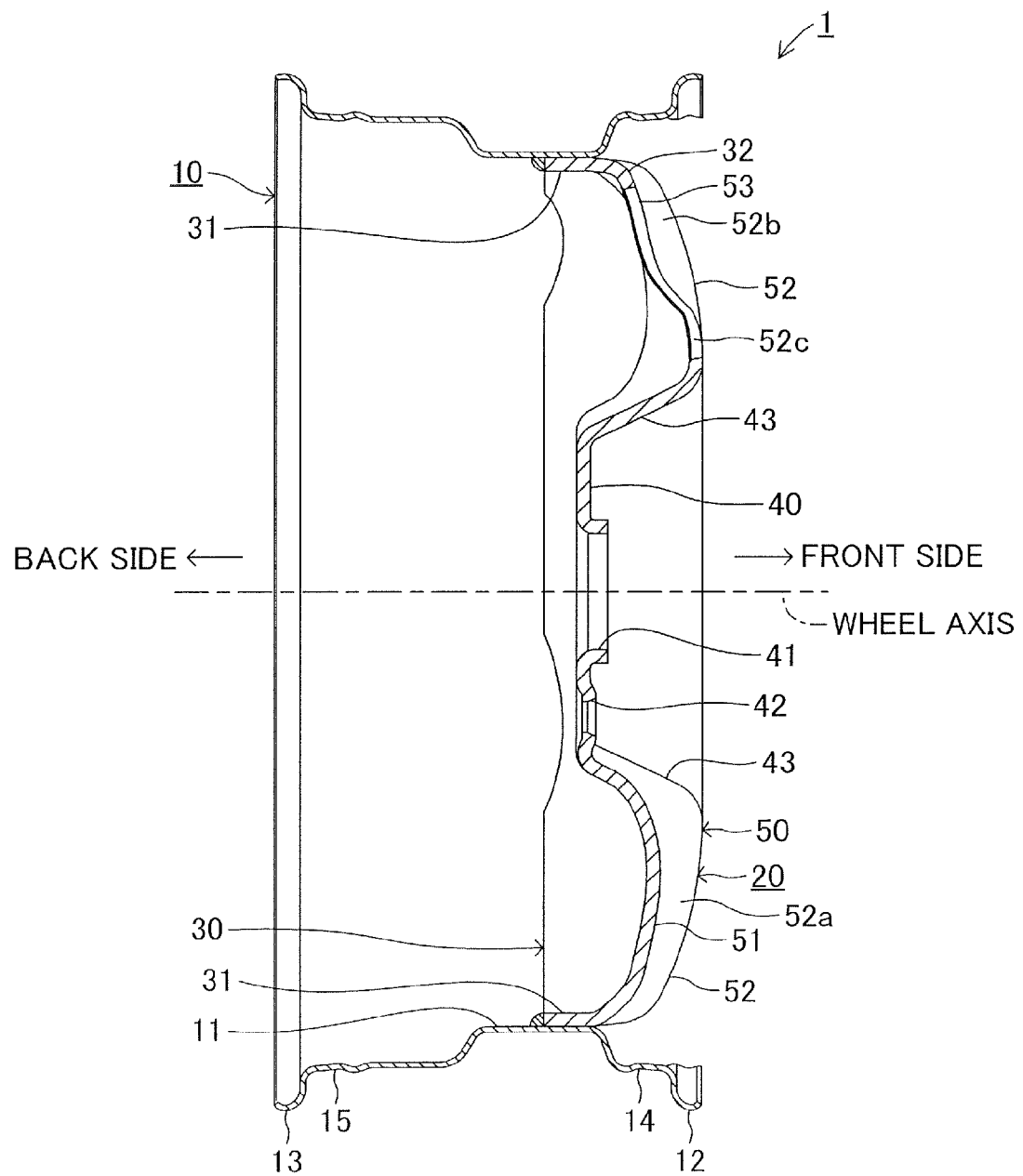
FIG. 2 is a cross-sectional view taken along the line A-A of FIG. 1.
Figure 3:
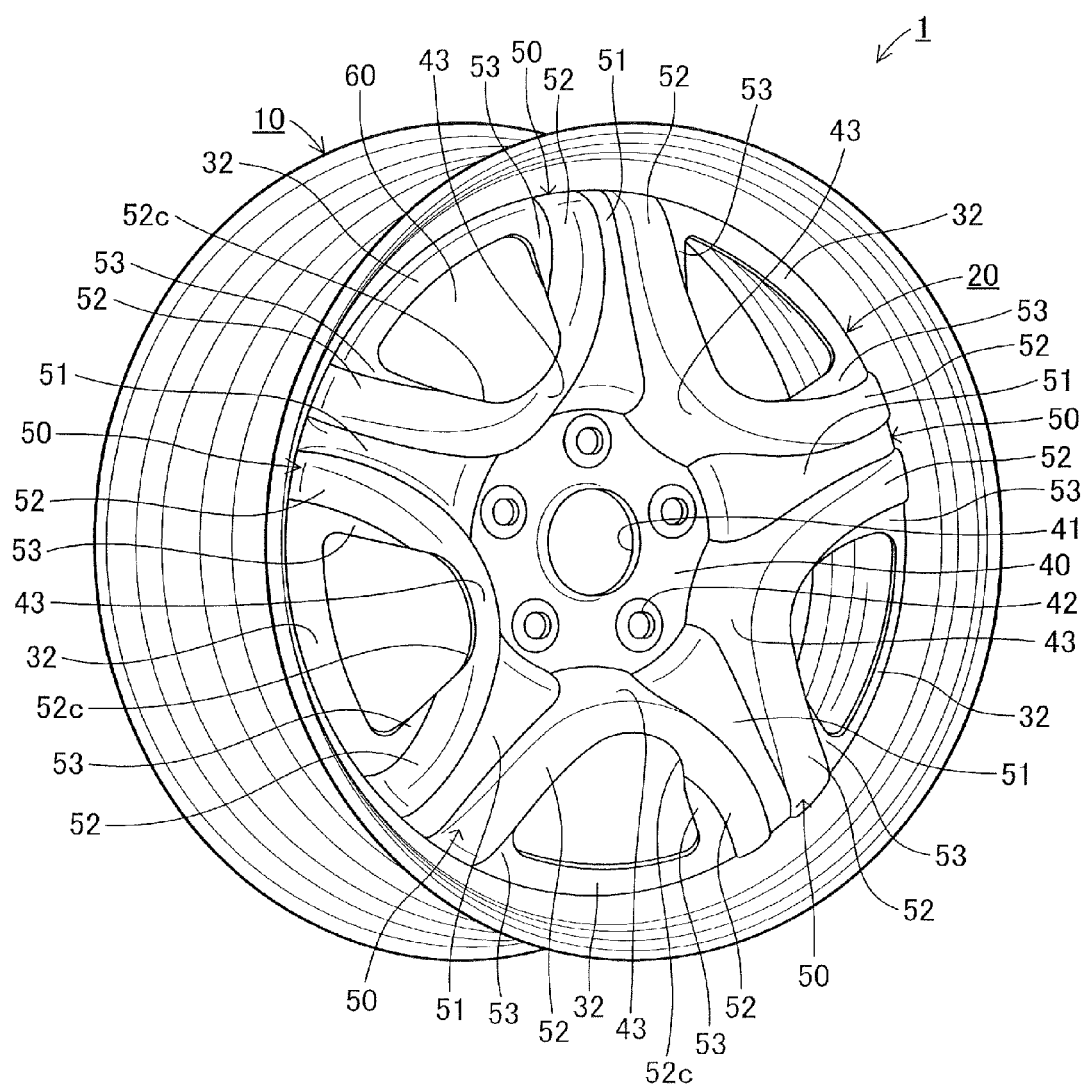
FIG. 3 is a perspective view of the automobile wheel.
Figure 4:
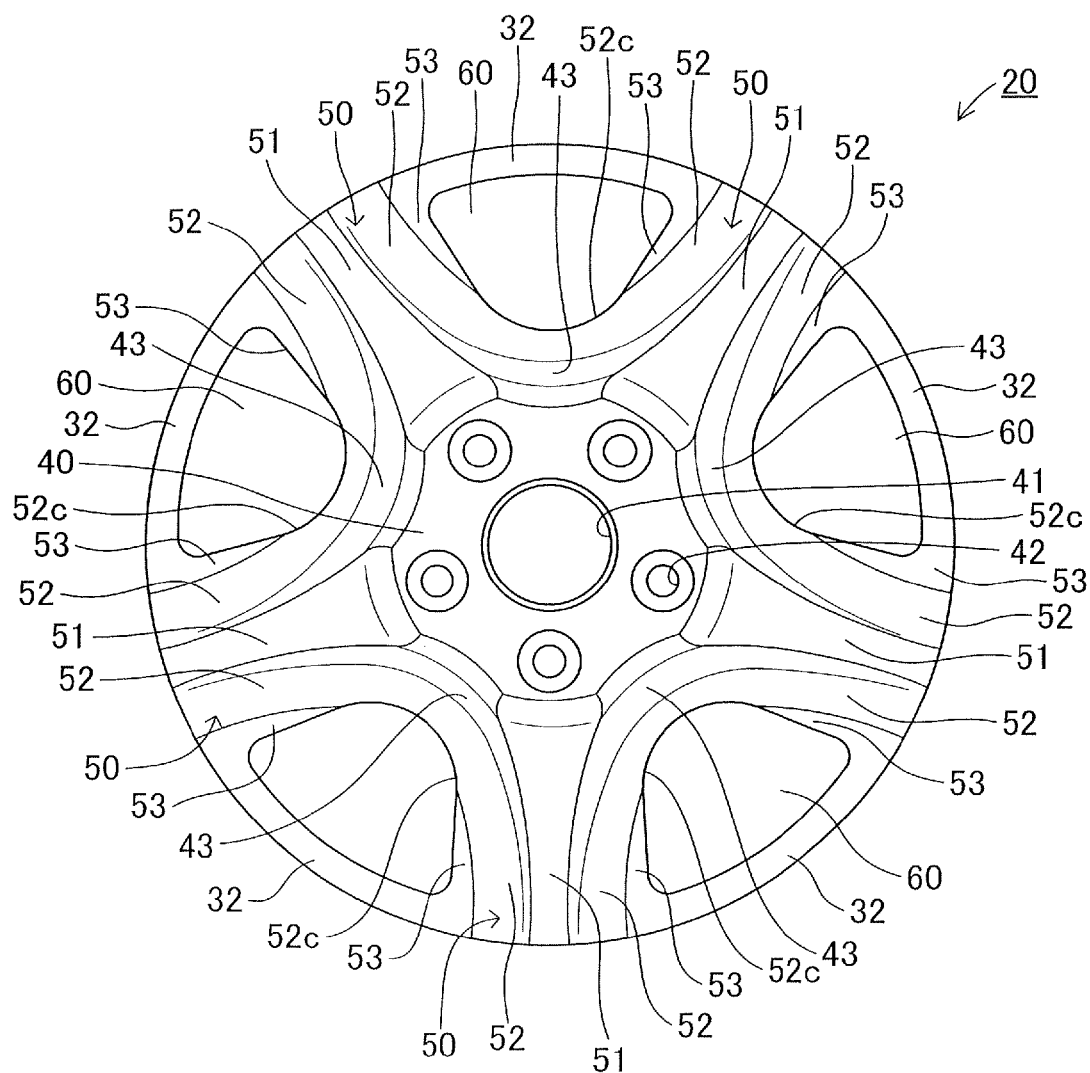
FIG. 4 is a front view of a wheel disc.
Figure 5:
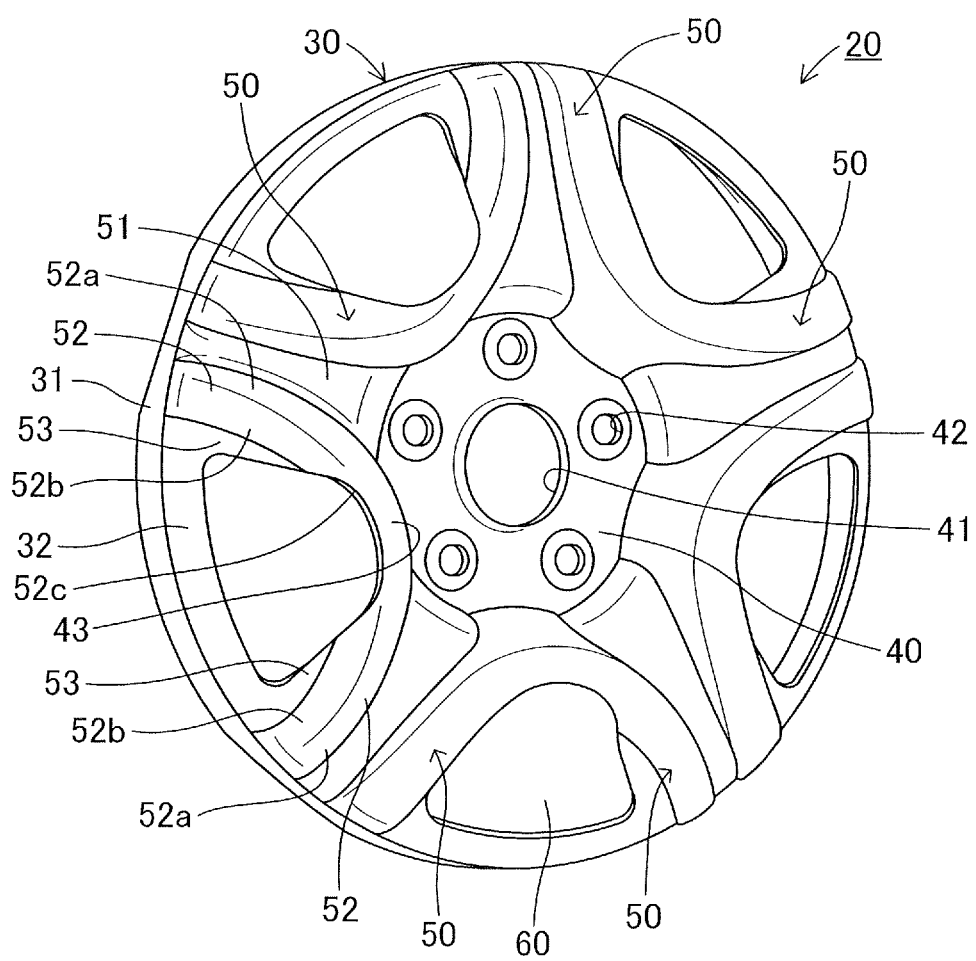
FIG. 5 is a perspective view of the wheel disc.
Figure 9:
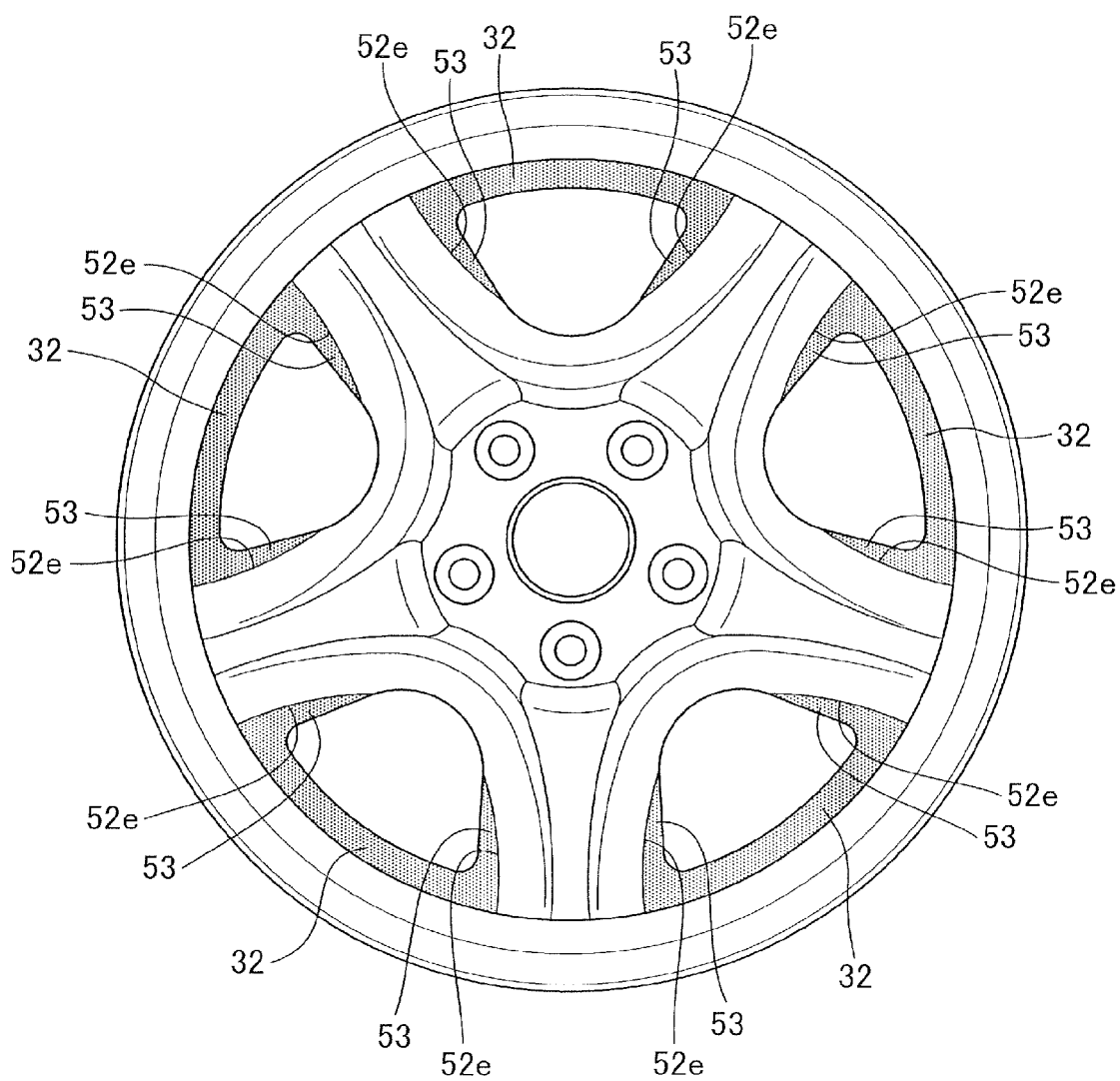
FIG. 9 is a view illustrating regions in each of which reinforcing plate portions and an inter-spoke plate portion form a continuous plate surface in a front view of the automobile wheel.
Figure 10:
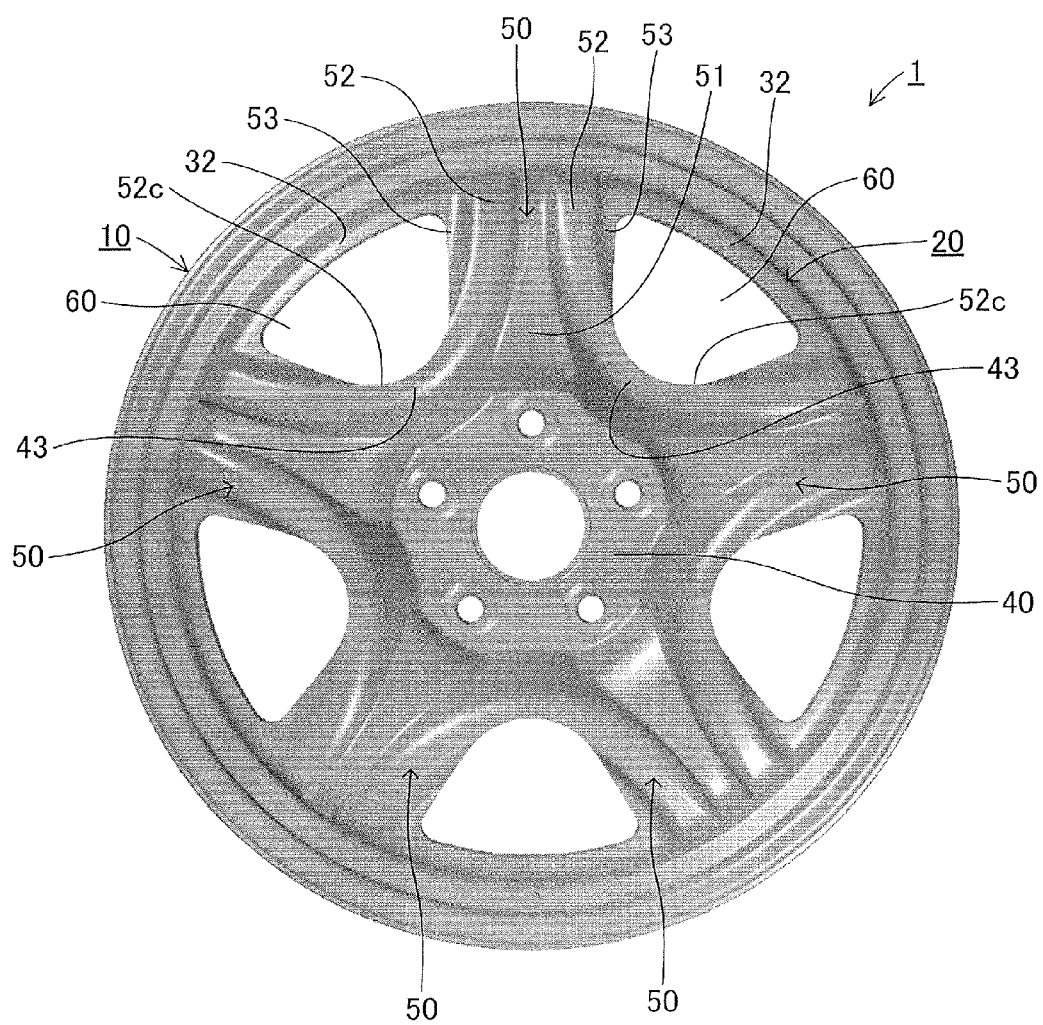
FIG. 10 is a front view illustrating a curved shape of the automobile wheel using shading.
Figure 11:
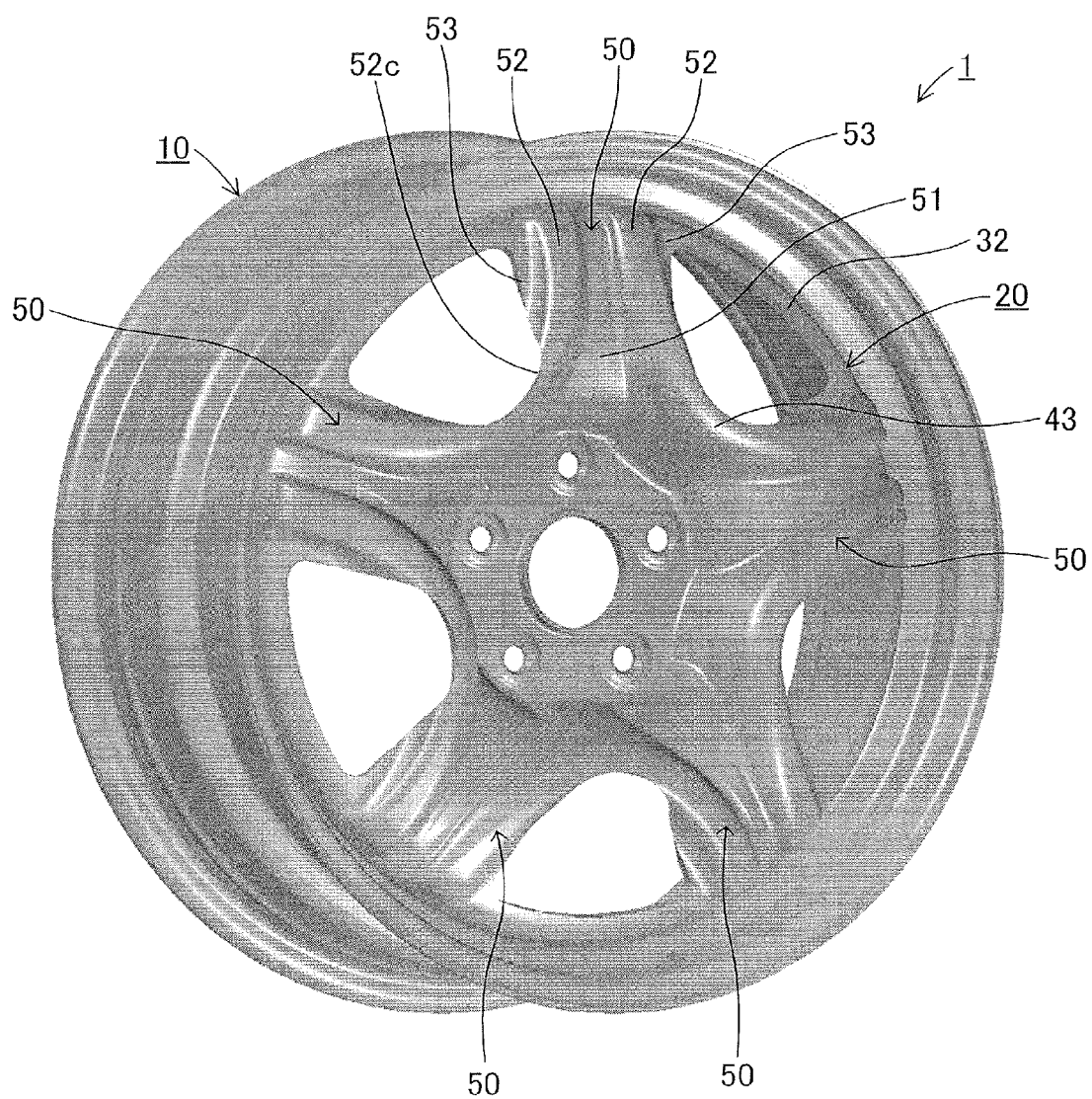
FIG. 11 is a perspective view illustrating the curved shape of the automobile wheel using shading.

Now, an embodiment of the present invention is described in detail with reference to the drawings. FIGS. 1 to 3 and FIGS. 9 to 11 illustrate an automobile wheel according to this embodiment. FIGS. 4 and 5 illustrate a wheel disc as a component of the automobile wheel according to this embodiment. Note that, FIGS. 10 and 11 illustrate a curved shape of the automobile wheel of FIGS. 1 and 3 using shading, respectively. An automobile wheel 1 is a steel wheel of a two-piece type including a wheel rim 10 formed by butt welding and shaping a steel flat plate, and a wheel disc 20 similarly formed by shaping a steel flat plate. As illustrated in FIG. 2, the automobile wheel 1 is integrally formed in such a manner that, after a flange portion 30 (hereinafter referred to as "disc flange portion 30") of the wheel disc 20 is fitted on an inner peripheral surface of a well portion 11 that serves as a cylindrical portion of the wheel rim 10 having a smallest diameter, a distal end region of the disc flange portion 30 is joined to the well portion 11 by a variety of welding methods such as arc welding, spot welding, and laser welding. In the automobile wheel 1 illustrated in FIG. 2, the left side of FIG. 2 corresponds to a back side of the automobile wheel 1, that is, a side to be mounted to a hub of an axle, and the right side of FIG. 2 corresponds to a front side of the automobile wheel 1, that is, an aesthetic surface side.

A rotation center axis of the automobile wheel 1 is hereinafter referred to as a wheel axis, and a direction of the wheel axis is hereinafter referred to as a wheel axial direction. In particular, a direction toward the front side (right arrow direction of FIG. 2) in the direction of the wheel axis is referred to as a wheel axially front side, and a direction toward the back side (left arrow direction of FIG. 2) in the direction of the wheel axis is referred to as a wheel axially back side. Further, a direction orthogonal to the wheel axis is referred to as a radial direction. In particular, a direction moving away from the wheel axis is referred to as a wheel radially outer side, and a direction approaching the wheel axis is referred to as a wheel radially inner side.

A front-side rim flange 12 and a back-side rim flange 13 for supporting side wall portions of a tire are formed at both ends of the wheel rim 10, respectively. A cylindrical front-side bead seat portion 14 for seating a bead of the tire thereon is formed on the wheel axially back side of the front-side rim flange 12, whereas a cylindrical back-side bead seat portion 15 for seating a bead of the tire thereon is formed on the wheel axially front side of the back-side rim flange 13. The well portion 11, into which the beads of the tire are dropped at the time of mounting of the tire, is formed between the front-side bead seat portion 14 and the back-side bead seat portion 15.

The well portion 11 is formed into a cylindrical shape dented to the wheel radially inner side with respect to the bead seat portions 14, 15.

The wheel disc 20 is integrally formed by pressing a single steel flat plate, and includes a disc-like hub mounting portion 40 coupled to the hub of the axle, the disc flange portion 30 connected to the inner peripheral surface of the well portion 11 of the wheel rim 10, and a plurality of spoke portions 50 for coupling the hub mounting portion 40 and the disc flange portion 30 together. In the hub mounting portion 40, a hub hole 41 is formed in a center of the hub mounting portion 40, and a plurality of bolt holes 42 are formed around the hub hole 41 at equal intervals concyclically. In this embodiment, five bolt holes 42 are formed, but the number of the bolt holes 42 is not limited to five.

Five spoke portions 50 are formed equiangularly so as to extend from an outer periphery of the hub mounting portion 40 to the wheel radially outer side. In this embodiment, five spoke portions 50 are formed, but the number of the spoke portions 50 is not limited to five. An outer end of each spoke portion 50 in a wheel radial direction is coupled to the disc flange portion 30. With this configuration, there are formed openings 60 each having a substantially triangular shape in front view and being surrounded by the adjacent spoke portions 50, the disc flange portion 30, and the hub mounting portion 40. In each spoke portion 50, a side to be coupled to the hub mounting portion 40 is hereinafter referred to as a proximal end side, and a side to be coupled to the disc flange portion 30 is hereinafter referred to as a distal end side. Note that, in this specification, the description: "couple" means not coupling between two components but continuous coupling, that is, coupling in shape.

Each spoke portion 50 includes a center groove bottom portion 51 formed at a center position in a spoke widthwise direction (circumferential direction) so as to extend in the wheel radial direction, and spoke projecting threads 52 arranged side by side on both sides of the center groove bottom portion 51 in the spoke widthwise direction. The center groove bottom portion 51 is bent from the outer periphery of the hub mounting portion 40 to the wheel axially front side so as to extend to the wheel radially outer side. As illustrated in FIG. 2, the center groove bottom portion 51 is formed into a slope shape bulging to the wheel axially front side, and is formed so as to have a width dimension narrowing toward the distal end side.

Figure 6:
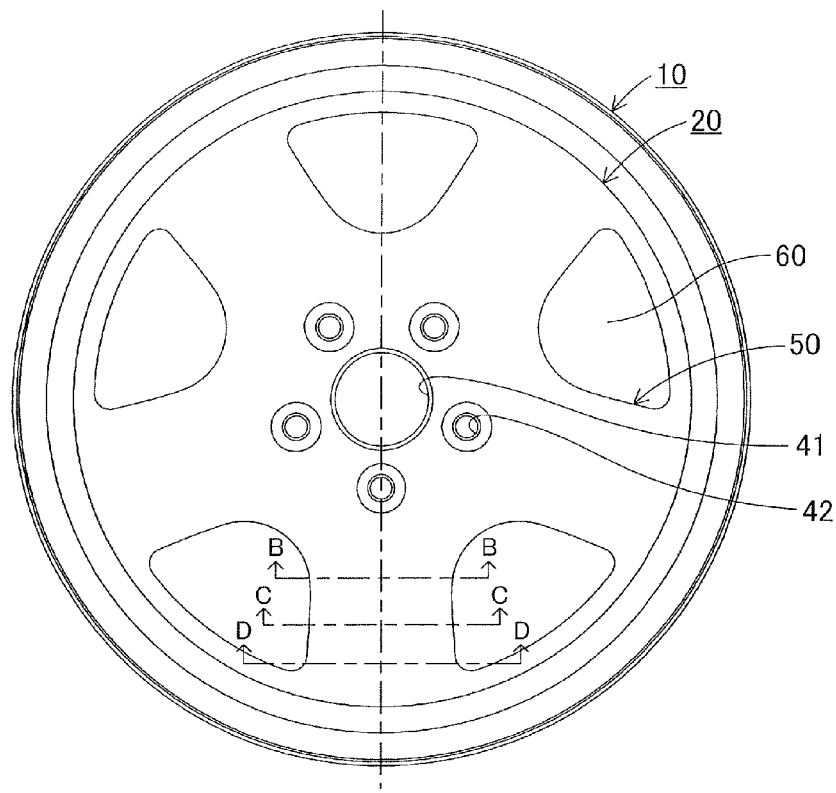
FIG. 6 is a front view of an outline of the wheel disc, for illustrating cut lines.
Figure 7:
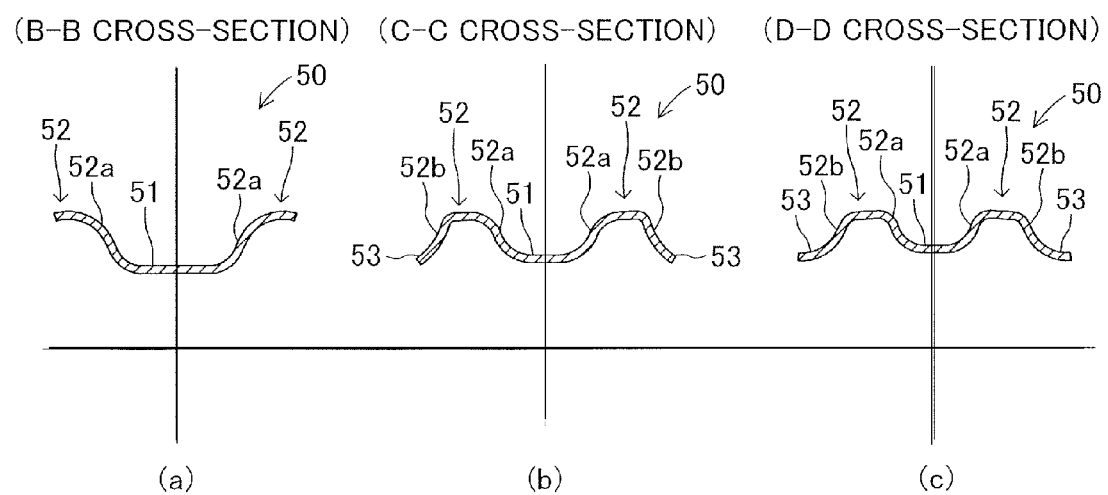
FIG. 7 are cross-sectional views of a spoke portion taken along the cut lines of FIG. 6.
Figure 8:
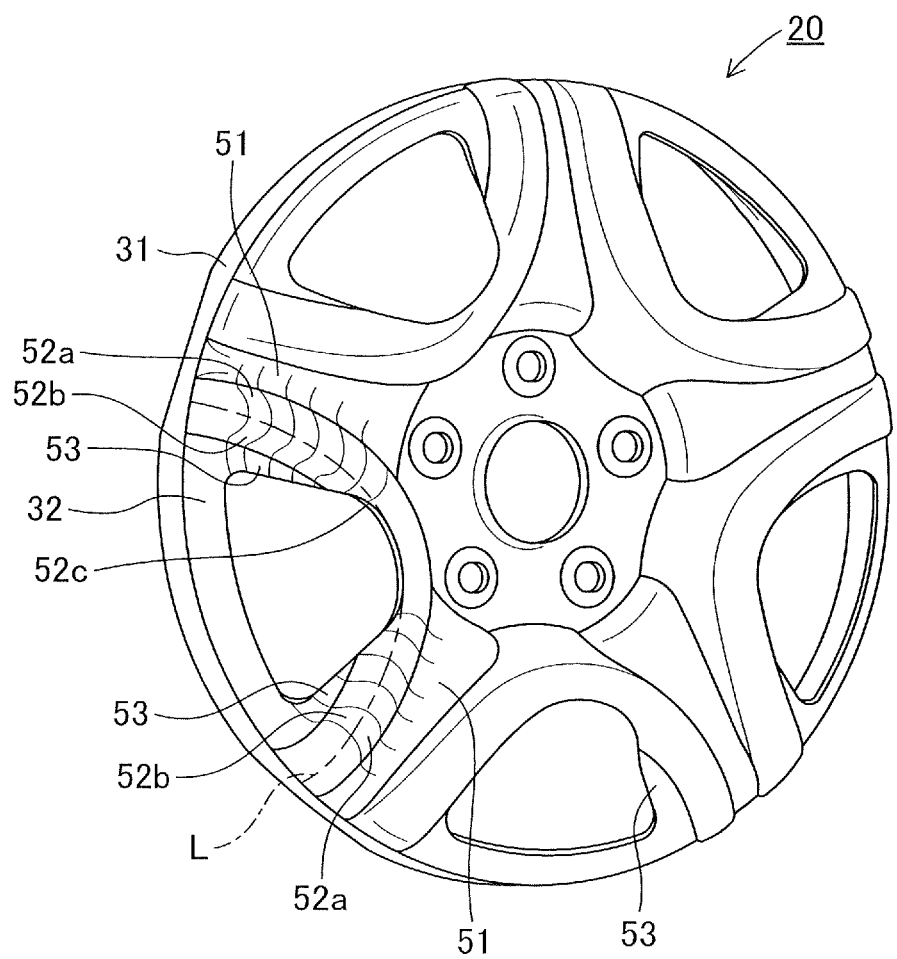
FIG. 8 is a perspective view of the wheel disc, for illustrating a curved shape of each spoke portion.

The spoke projecting threads 52 are formed on the both sides of the center groove bottom portion 51 in the spoke widthwise direction so as to extend in a forming direction (wheel radial direction) of the center groove bottom portion 51. The spoke projecting threads 52 are formed on right and left sides of the center groove bottom portion 51 so as to be bilaterally symmetrical with respect to the single spoke portion 50. FIG. 8 schematically illustrates a plurality of imaginary cut lines that appear on a surface of each spoke projecting thread 52 when cut along the spoke widthwise direction, for the purpose of illustrating an image of a curved surface shape of the spoke projecting thread 52. Further, a line L indicated by the chain line of FIG. 8 represents a ridgeline of the top of the spoke projecting thread 52. Further, FIG. 7 illustrate cross-sections of the spoke projecting thread 52 in the spoke widthwise direction taken along the cut lines (lines B-B, C-C, and D-D) of FIG. 6. As illustrated in FIG. 7, each spoke projecting thread 52 includes an inner curved surface portion 52a bent and extended to the wheel axially front side from an end of the center groove bottom portion 51 in the spoke widthwise direction so as to incline upward to the wheel axially front side with respect to the center groove bottom portion 51, and an outer curved surface portion 52b formed continuously with the inner curved surface portion 52a so as to incline obliquely downward to the wheel axially back side. The inner curved surface portion 52a and the outer curved surface portion 52b are formed continuously with each other, and thus the spoke projecting thread 52 is curved and formed so that its cross-section in the spoke widthwise direction projects to the wheel axially front side in a mountain shape. A boundary between the inner curved surface portion 52a and the outer curved surface portion 52b corresponds to the top (indicated by the line L) of the spoke projecting thread 52, which projects to the foremost side in the wheel axial direction, but the top may be flattened. In this embodiment, the boundary between the inner curved surface portion 52a and the outer curved surface portion 52b is formed into a gentle curved surface approximate to a flat surface.

The spoke projecting threads 52 are arranged on the both sides of the center groove bottom portion 51 in the spoke widthwise direction along the center groove bottom portion 51, and hence similarly to the center groove bottom portion 51, each of the spoke projecting threads 52 is formed into a shape bulging to the wheel axially front side in side view. The spoke portion 50 is formed by the center groove bottom portion 51 and the spoke projecting threads 52 formed on the both sides of the center groove bottom portion 51, and thus a center of the spoke portion 50 in the spoke widthwise direction exhibits a groove shape dented to the wheel axially back side.

Further, a width of the center groove bottom portion 51 of the spoke portion 50 becomes narrower to the wheel radially outer side, that is, to the distal end side, and hence the right and left spoke projecting threads 52 formed on the both sides of the center groove bottom portion 51 are also formed so as to approach each other in conformity with the center groove bottom portion 51. That is, a positional relationship between the right and left spoke projecting threads 52 is set so that center axes of the spoke projecting threads 52 formed on the both sides of the center groove bottom portion 51 approach each other toward the distal end side of the spoke portion 50.

Further, the outer curved surface portion 52b of the spoke projecting thread 52 is cut out on the proximal end side with respect to a substantially intermediate position in the spoke radial direction. That is, a length of inclination of the outer curved surface portion 52b inclining downward from the top of the spoke projecting thread 52 is smaller on the proximal end side than at the intermediate position in the spoke radial direction. The cut-out part is referred to as a cutout 52c. The cutout 52c becomes wider toward the proximal end side. At a proximal end portion of the spoke portion 50, the outer curved surface portion 52b is not substantially present. Therefore, the spoke projecting thread 52 at the proximal end portion of the spoke portion 50 is formed only by the inner curved surface portion 52a.

On the outer peripheral side of the hub mounting portion 40, there are formed spoke projecting thread coupling portions 43 each configured to couple together the spoke projecting threads 52 facing each other across the opening 60, that is, a right spoke projecting thread 52 of one of the adjacent spoke portions 50 and a left spoke projecting thread 52 of another one of the adjacent spoke portions 50. In each of the spoke projecting threads 52, the outer curved surface portion 52b on the proximal end side is cut out. Therefore, the spoke projecting thread coupling portion 43 couples the inner curved surface portions 52a of the spoke projecting threads 52 together. In this case, the spoke projecting thread coupling portion 43 has the same cross-sectional shape as that of each inner curved surface portion 52a formed at the proximal end portion of the spoke portion 50, and integrally couples together the inner curved surface portion 52*a* of one of the spoke projecting threads 52 and the inner curved surface portion 52*a* of another one of the spoke projecting threads 52 in a U-shaped manner when viewed from the wheel axial direction (in front view).

As illustrated in FIG. 2, the disc flange portion 30 includes an annular fitting portion 31 fitted on the inner peripheral surface of the well portion 11 of the wheel rim 10, and is coupled to the distal end of each spoke portion 50 at a front end of the fitting portion 31 in the wheel axial direction. At a radially outer end of the spoke portion 50, the center groove bottom portion 51, the inner curved surface portions 52*a*, and the outer curved surface portions 52*b* are bent to the wheel axially back side to be coupled to the fitting portion 31. A region at the front end of the fitting portion 31 in the wheel axial direction, which is not coupled to the distal end of the spoke portion 50, is bent to the wheel radially inner side. With this configuration, at the front end of the fitting portion 31 in the wheel axial direction, inter-spoke plate portions 32 having a circular-arc shape and a constant width (width in the wheel radial direction) are each formed between the adjacent spoke portions 50 so as to extend to the wheel radially inner side.

In each of the spoke portions 50, a side edge of the outer curved surface portion 52*b* of the spoke projecting thread 52 is bent outward in the spoke widthwise direction, and thus a circumferential end of the inter-spoke plate portion 32 is coupled to the side edge of the outer curved surface portion 52*b*. Therefore, the distal end of each of the spoke portions 50 is coupled to the inter-spoke plate portion 32 at a position at which the distal end of each of the spoke portions 50 is dented to the wheel axially back side with respect to the top of the spoke projecting thread 52.

Further, the side edge of the outer curved surface portion 52*b* of the spoke projecting thread 52 is bent and extended outward in the spoke widthwise direction not only at a portion coupled to the inter-spoke plate portion 32 but also on the proximal end side (wheel radially inner side) with respect to the coupled portion. With this configuration, in the outer curved surface portion 52*b*, a reinforcing plate portion 53 is formed so as to extend from the side edge of the outer curved surface portion 52*b* outward in the spoke widthwise direction. That is, the reinforcing plate portion 53 is formed so as to protrude from the side edge of the outer curved surface portion 52*b* so as to cover the opening 60.

The reinforcing plate portion 53 is formed on the distal end side with respect to the substantially intermediate position of each of the spoke portions 50 in the wheel radial direction, that is, on a side including no cutout 52*c*. Further, the reinforcing plate portion 53 is formed so that a protruding length of the reinforcing plate portion 53 in the spoke widthwise direction becomes smaller toward the proximal end side (wheel radially inner side) and becomes larger toward the distal end side (wheel radially outer side). Note that, the protruding length in the spoke widthwise direction refers to a length of a surface in the spoke widthwise direction (direction orthogonal to a spoke axis) between an end portion of the reinforcing plate portion 53 and a portion at which the side edge of the outer curved surface portion 52*b* is bent outward in the spoke widthwise direction.

Further, the reinforcing plate portion 53 is formed into a plate surface continuous with the inter-spoke plate portion 32. That is, the reinforcing plate portion 53 is formed so as to be positioned on an imaginary plane obtained by extending the inter-spoke plate portion 32 to the wheel radially inner side, in other words, formed in such a relationship as to be positioned on the same plane with the inter-spoke plate portion 32, and thus the reinforcing plate portion 53 is smoothly continuous with the inter-spoke plate portion 32. Therefore, the reinforcing plate portions 53 and the inter-spoke plate portion 32 form the same plate surface without coupling portions in terms of an external appearance. FIG. 9 illustrates solidly shaded regions in each of which the reinforcing plate portions 53 and the inter-spoke plate portion 32 form a continuous plate surface. In FIG. 9, the reference symbol 52*e* represents an outer edge of the spoke projecting thread 52 in the spoke widthwise direction, that is, the side edge of the outer curved surface portion 52*b*.

Further, the reinforcing plate portion 53 is formed by bending the side edge of the outer curved surface portion 52*b* so as to extend outward in the spoke widthwise direction. The bent portion is formed into a curved surface shape that is rounded so as to be dented to the back side.

According to the above-mentioned automobile wheel 1 of this embodiment, the spoke projecting threads 52 having a mountain shape in cross-section and projecting to the wheel axially front side are formed on the both sides of each spoke portion 50, and hence it is possible to increase rigidity of the entire spoke portion 50. In addition, the reinforcing plate portion 53 protruding from the outer edge of each of the spoke projecting threads 52 toward the opening 60 is integrally coupled to the inter-spoke plate portion 32 in such a relationship as to be positioned on the same plane with the inter-spoke plate portion 32, and hence the spoke portion 50 and the inter-spoke plate portion 32 are coupled extremely firmly. This can further increase rigidity of the distal end side of the spoke portion 50. Further, a coupling portion (bent portion) between the spoke portion 50 and the inter-spoke plate portion 32 is less likely to be deformed.

Further, a length of the reinforcing plate portion 53, which protrudes outward in the spoke widthwise direction, becomes smaller toward the proximal end side of the spoke portion 50, and the cutout of the outer curved surface portion 52*b* becomes wider toward the proximal end side of the spoke portion 50. Moreover, the spoke projecting thread coupling portion 43 couples the inner curved surface portions 52*a* of the spoke projecting threads 52 together. With this configuration, cooling performance of a braking device (not shown) can be maintained by preventing the opening 60 from being narrowed to the extent possible, and rigidity of the distal end side of the spoke portion 50 can be increased with excellent balance. Further, the outer edges of the spoke projecting threads 52 facing the opening 60 can be formed into a smooth continuous shape. Further, the spoke projecting thread coupling portion 43 is formed so that a portion of the spoke projecting thread coupling portion 43 coupling the inner curved surface portions 52*a* of the spoke projecting threads 52 together is positioned on the foremost side of the wheel disc 20 in the wheel axial direction.

Further, in each spoke portion 50, the spoke projecting threads 52 arranged side by side on the both sides of the center groove bottom portion 51 are formed so as to approach each other toward the distal end side of the spoke portion 50 (toward the wheel radially outer side). Accordingly, even when the reinforcing plate portion 53 protruding from the side edge of the spoke projecting thread 52 is formed, it is possible to prevent a spoke width from becoming wider toward the distal end side. That is, the protruding length of the reinforcing plate portion 53 becomes larger toward the distal end side, and hence when the right and left spoke projecting threads 52 are formed in parallel to each other, the spoke width becomes wider toward the distal end side. However, in this embodiment, as the protruding length of the reinforcing plate portion 53 becomes larger, a separation distance between the right and left spoke projecting threads 52 becomes smaller. Accordingly, a width of the spoke portion 50 can be set to substantially the same dimension in a region from the proximal end side to the distal end side. With this configuration, it is possible to enhance rigidity balance while maintaining excellent design quality. Further, the opening 60 can be kept wide, and hence there is no reduction in cooling performance of the braking device (not shown).

Consequently, according to this embodiment, it is possible to keep excellent cooling performance of the braking device and excellent design quality by preventing the opening 60 from being narrowed to the extent possible, and to increase rigidity of the entire automobile wheel 1.

The automobile wheel according to this embodiment is described above, but the present invention is not limited to the above-mentioned embodiment. Various modifications may be made thereto without departing from the gist of the present invention.

For example, in this embodiment, a steel flat plate is used as a plate material for forming the wheel disc and the wheel rim. However, a flat plate made of, for example, aluminum, magnesium alloy, or titanium alloy may be also used.

Further, in this embodiment, the proximal end side of the outer curved surface portion 52b of the spoke projecting thread 52 is cut out, but the proximal end side is not necessarily cut out. In this case, there may be adopted such a configuration that, also in the spoke projecting thread coupling portion 43, the outer curved surface portion 52b and the inner curved surface portion 52a of the spoke projecting thread 52 are integrally coupled together.

Further, the automobile wheel according to this embodiment is an automobile wheel of a type in which the disc flange portion 30 is fitted on the inner peripheral surface of the well portion 11 of the wheel rim 10, but there may be adopted a type in which the disc flange portion 30 is fitted on the inner peripheral surface of the front-side bead seat portion 14.

Further, the automobile wheel according to this embodiment has such a configuration that the fitting portion 31 is formed into an annular shape and an entire periphery of the fitting portion 31 abuts on an entire periphery of the inner peripheral surface of the wheel rim 10, but the present invention is not limited thereto. The fitting portion may be formed of a plurality of circular-arc-shaped members. That is, the automobile wheel may have such a configuration that the fitting portions each having a circular-arc shape may couple together the distal ends of the adjacent spoke portions and the fitting portions abut on the inner peripheral surface of the wheel rim. In this case, the adjacent fitting portions are arranged at predetermined intervals in a circumferential direction. Therefore, for example, in a case where the automobile wheel includes five spoke portions, five fitting portions each having a circular-arc shape are provided.

The invention claimed is:

1. An automobile wheel, comprising:
a wheel rim for supporting beads of a tire; and
a wheel disc comprising:
   a hub mounting portion to be coupled to a hub of an axle;
   a disc flange portion connected to an inner peripheral surface of the wheel rim; and
   a plurality of spoke portions extended from the hub mounting portion to a wheel radially outer side so as to couple the hub mounting portion and the disc flange portion together,
   the hub mounting portion, the disc flange portion, and the plurality of spoke portions being formed integrally with each other,
   the wheel disc having openings each being surrounded by adjacent spoke portions among the plurality of spoke portions, the disc flange portion, and the hub mounting portion,
each of the plurality of spoke portions comprising:
   a center groove bottom portion formed at a center position of the each of the plurality of spoke portions in a spoke widthwise direction so as to extend in a wheel radial direction; and
   spoke projecting threads arranged side by side on both sides of the center groove bottom portion in the spoke widthwise direction, each of the spoke projecting threads being curved and formed so that a cross-section thereof in the spoke widthwise direction projects to a wheel axially front side in a mountain shape,
   the hub mounting portion comprising spoke projecting thread coupling portions each configured to couple together the spoke projecting threads, which face each other across each of the openings between the adjacent spoke portions, in a U-shaped manner when viewed from a wheel axial direction,
the disc flange portion comprising:
   a fitting portion fitted on the inner peripheral surface of the wheel rim and coupled to distal ends of the plurality of spoke portions; and
   inter-spoke plate portions each having a concentric circular-arc shape, each of the inter-spoke plate portions being formed between the adjacent spoke portions by bending a front end of the fitting portion in the wheel axial direction to a wheel radially inner side,
an outer edge of the each of the spoke projecting threads in the spoke widthwise direction of the each of the plurality of spoke portions being bent outward in the spoke widthwise direction so that the each of the spoke projecting threads and the each of the inter-spoke plate portions are coupled together on a distal end side of the each of the plurality of spoke portions,
the each of the plurality of spoke portions further comprising a reinforcing plate portion formed in a region from a portion coupled to the each of the inter-spoke plate portions to a proximal end side of the each of the plurality of spoke portions so as to protrude toward the each of the openings from the outer edge of the each of the spoke projecting threads in the spoke widthwise direction,
the reinforcing plate portion being formed into a plate surface continuous with the each of the inter-spoke plate portions, and a length of the reinforcing plate portion, which protrudes toward the each of the openings outward in the spoke widthwise direction, becoming smaller toward the proximal end side of the each of the plurality of spoke portions.

2. An automobile wheel according to claim 1, wherein the reinforcing plate portion is formed on the distal end side with respect to an intermediate position of the each of the plurality of spoke portions in a radial direction.

3. An automobile wheel according to claim 1, wherein two of the spoke projecting threads arranged side by side on the both sides of the center groove bottom portion are formed so as to approach each other toward the distal end side of the each of the plurality of spoke portions.

4. An automobile wheel according to claim 1,
wherein the each of the spoke projecting threads comprises:
   an inner curved surface portion bent to the wheel axially front side from an end of the center groove bottom portion in the spoke widthwise direction so as to incline upward; and an outer curved surface portion formed continuously with the inner curved surface portion so as to incline downward to a wheel axially back side, the each of the spoke projecting threads being curved and formed by the inner curved surface portion and the outer curved surface portion so that the cross-section thereof in the spoke widthwise direction projects to the wheel axially front side in the mountain shape, wherein the outer curved surface portion is cut out on the proximal end side of the each of the plurality of spoke portions, and wherein each of the spoke projecting thread coupling portions couples together the inner curved surface portion of one of the spoke projecting threads and the inner curved surface portion of another one of the spoke projecting threads.

5. An automobile wheel according to claim 4, wherein the outer curved surface portion comprises a cutout formed by cutting out a side edge of the outer curved surface portion so as to become wider toward the proximal end side of the each of the plurality of spoke portions, and wherein the reinforcing plate portion is formed so as to protrude toward the each of the openings outward in the spoke widthwise direction from the side edge of the outer curved surface portion, which is positioned on the distal end side including no cutout.

6. An automobile wheel, comprising:

a wheel rim for supporting beads of a tire; and a wheel disc comprising:
   a hub mounting portion to be coupled to a hub of an axle;
   a disc flange portion connected to an inner peripheral surface of the wheel rim; and
   a plurality of spoke portions extended from the hub mounting portion to a wheel radially outer side so as to couple the hub mounting portion and the disc flange portion together,
   the hub mounting portion, the disc flange portion, and the plurality of spoke portions being formed integrally with each other,
   the wheel disc having openings each being surrounded by adjacent spoke portions among the plurality of spoke portions, the disc flange portion, and the hub mounting portion, each of the plurality of spoke portions comprising:
   a center groove bottom portion formed at a center position of the each of the plurality of spoke portions in a spoke widthwise direction so as to extend in a wheel radial direction; and
   spoke projecting threads arranged side by side on both sides of the center groove bottom portion in the spoke widthwise direction, each of the spoke projecting threads being curved and formed so that a cross-section thereof in the spoke widthwise direction projects to a wheel axially front side in a mountain shape,
   the hub mounting portion comprising spoke projecting thread coupling portions each configured to couple together the spoke projecting threads, which face each other across each of the openings between the adjacent spoke portions, in a U-shaped manner when viewed from a wheel axial direction, the disc flange portion comprising:
   a fitting portion fitted on the inner peripheral surface of the wheel rim and coupled to distal ends of the plurality of spoke portions; and
   inter-spoke plate portions each having a concentric circular-arc shape, each of the inter-spoke plate portions being formed between the adjacent spoke portions by bending a front end of the fitting portion in the wheel axial direction to a wheel radially inner side, an outer edge of the each of the spoke projecting threads in the spoke widthwise direction of the each of the plurality of spoke portions being bent outward in the spoke widthwise direction so that the each of the spoke projecting threads and the each of the inter-spoke plate portions are coupled together on a distal end side of the each of the plurality of spoke portions, the each of the plurality of spoke portions further comprising a reinforcing plate portion formed in a region from a portion coupled to the each of the inter-spoke plate portions to a proximal end side of the each of the plurality of spoke portions so as to protrude toward the each of the openings from the outer edge of the each of the spoke projecting threads in the spoke widthwise direction, the reinforcing plate portion being formed into a plate surface continuous with the each of the inter-spoke plate portions, and a length of the reinforcing plate portion, which protrudes toward the each of the openings outward in the spoke widthwise direction, becoming smaller toward the proximal end side of the each of the plurality of spoke portions, wherein the reinforcing plate portion is formed on the distal end side with respect to an intermediate position of the each of the plurality of spoke portions in a radial direction, wherein two of the spoke projecting threads arranged side by side on the both sides of the center groove bottom portion are formed so as to approach each other toward the distal end side of the each of the plurality of spoke portions.

7. An automobile wheel according to claim 6, wherein the each of the spoke projecting threads comprises:
   an inner curved surface portion bent to the wheel axially front side from an end of the center groove bottom portion in the spoke widthwise direction so as to incline upward; and
   an outer curved surface portion formed continuously with the inner curved surface portion so as to incline downward to a wheel axially back side,
   the each of the spoke projecting threads being curved and formed by the inner curved surface portion and the outer curved surface portion so that the cross-section thereof in the spoke widthwise direction projects to the wheel axially front side in the mountain shape, wherein the outer curved surface portion is cut out on the proximal end side of the each of the plurality of spoke portions, and wherein each of the spoke projecting thread coupling portions couples together the inner curved surface portion of one of the spoke projecting threads and the inner curved surface portion of another one of the spoke projecting threads.

8. An automobile wheel according to claim 7, wherein the outer curved surface portion comprises a cutout formed by cutting out a side edge of the outer curved surface portion so as to become wider toward the proximal end side of the each of the plurality of spoke portions, and wherein the reinforcing plate portion is formed so as to protrude toward the each of the openings outward in the spoke widthwise direction from the side edge of the outer curved surface portion, which is positioned on the distal end side including no cutout.

9. An automobile wheel, comprising:
a wheel rim for supporting beads of a tire; and
a wheel disc comprising:
  a hub mounting portion to be coupled to a hub of an axle;
  a disc flange portion connected to an inner peripheral surface of the wheel rim; and
  a plurality of spoke portions extended from the hub mounting portion to a wheel radially outer side so as to couple the hub mounting portion and the disc flange portion together,
  the hub mounting portion, the disc flange portion, and the plurality of spoke portions being formed integrally with each other,
  the wheel disc having openings each being surrounded by adjacent spoke portions among the plurality of spoke portions, the disc flange portion, and the hub mounting portion,
each of the plurality of spoke portions comprising:
  a center groove bottom portion formed at a center position of the each of the plurality of spoke portions in a spoke widthwise direction so as to extend in a wheel radial direction; and
  spoke projecting threads arranged side by side on both sides of the center groove bottom portion in the spoke widthwise direction, each of the spoke projecting threads being curved and formed so that a cross-section thereof in the spoke widthwise direction projects to a wheel axially front side in a mountain shape,
the hub mounting portion comprising spoke projecting thread coupling portions each configured to couple together the spoke projecting threads, which face each other across each of the openings between the adjacent spoke portions, in a U-shaped manner when viewed from a wheel axial direction,
the disc flange portion comprising:
  a fitting portion fitted on the inner peripheral surface of the wheel rim and coupled to distal ends of the plurality of spoke portions; and
  inter-spoke plate portions each having a concentric circular-arc shape, each of the inter-spoke plate portions being formed between the adjacent spoke portions by bending a front end of the fitting portion in the wheel axial direction to a wheel radially inner side,
an outer edge of the each of the spoke projecting threads in the spoke widthwise direction of the each of the plurality of spoke portions being bent outward in the spoke widthwise direction so that the each of the spoke projecting threads and the each of the inter-spoke plate portions are coupled together on a distal end side of the each of the plurality of spoke portions,
the each of the plurality of spoke portions further comprising a reinforcing plate portion formed in a region from a portion coupled to the each of the inter-spoke plate portions to a proximal end side of the each of the plurality of spoke portions so as to protrude toward the each of the openings from the outer edge of the each of the spoke projecting threads in the spoke widthwise direction,
the reinforcing plate portion being formed into a plate surface continuous with the each of the inter-spoke plate portions, and a length of the reinforcing plate portion, which protrudes toward the each of the openings outward in the spoke widthwise direction, becoming smaller toward the proximal end side of the each of the plurality of spoke portions,
wherein the reinforcing plate portion is formed on the distal end side with respect to an intermediate position of the each of the plurality of spoke portions in a radial direction,
wherein the each of the spoke projecting threads comprises:
  an inner curved surface portion bent to the wheel axially front side from an end of the center groove bottom portion in the spoke widthwise direction so as to incline upward; and
  an outer curved surface portion formed continuously with the inner curved surface portion so as to incline downward to a wheel axially back side,
  the each of the spoke projecting threads being curved and formed by the inner curved surface portion and the outer curved surface portion so that the cross-section thereof in the spoke widthwise direction projects to the wheel axially front side in the mountain shape,
wherein the outer curved surface portion is cut out on the proximal end side of the each of the plurality of spoke portions, and
wherein each of the spoke projecting thread coupling portions couples together the inner curved surface portion of one of the spoke projecting threads and the inner curved surface portion of another one of the spoke projecting threads.

10. An automobile wheel according to claim 9,
wherein the outer curved surface portion comprises a cutout formed by cutting out a side edge of the outer curved surface portion so as to become wider toward the proximal end side of the each of the plurality of spoke portions, and
wherein the reinforcing plate portion is formed so as to protrude toward the each of the openings outward in the spoke widthwise direction from the side edge of the outer curved surface portion, which is positioned on the distal end side including no cutout.

11. An automobile wheel, comprising:
a wheel rim for supporting beads of a tire; and
a wheel disc comprising:
  a hub mounting portion to be coupled to a hub of an axle;
  a disc flange portion connected to an inner peripheral surface of the wheel rim; and
  a plurality of spoke portions extended from the hub mounting portion to a wheel radially outer side so as to couple the hub mounting portion and the disc flange portion together,
  the hub mounting portion, the disc flange portion, and the plurality of spoke portions being formed integrally with each other,
  the wheel disc having openings each being surrounded by adjacent spoke portions among the plurality of spoke portions, the disc flange portion, and the hub mounting portion,
each of the plurality of spoke portions comprising:
  a center groove bottom portion formed at a center position of the each of the plurality of spoke portions in a spoke widthwise direction so as to extend in a wheel radial direction; and
  spoke projecting threads arranged side by side on both sides of the center groove bottom portion in the spoke widthwise direction, each of the spoke projecting threads being curved and formed so that a cross-section thereof in the spoke widthwise direction projects to a wheel axially front side in a mountain shape, the hub mounting portion comprising spoke projecting thread coupling portions each configured to couple together the spoke projecting threads, which face each other across each of the openings between the adjacent spoke portions, in a U-shaped manner when viewed from a wheel axial direction, the disc flange portion comprising:
  a fitting portion fitted on the inner peripheral surface of the wheel rim and coupled to distal ends of the plurality of spoke portions; and
  inter-spoke plate portions each having a concentric circular-arc shape, each of the inter-spoke plate portions being formed between the adjacent spoke portions by bending a front end of the fitting portion in the wheel axial direction to a wheel radially inner side, an outer edge of the each of the spoke projecting threads in the spoke widthwise direction of the each of the plurality of spoke portions being bent outward in the spoke widthwise direction so that the each of the spoke projecting threads and the each of the inter-spoke plate portions are coupled together on a distal end side of the each of the plurality of spoke portions, the each of the plurality of spoke portions further comprising a reinforcing plate portion formed in a region from a portion coupled to the each of the inter-spoke plate portions to a proximal end side of the each of the plurality of spoke portions so as to protrude toward the each of the openings from the outer edge of the each of the spoke projecting threads in the spoke widthwise direction, the reinforcing plate portion being formed into a plate surface continuous with the each of the inter-spoke plate portions, and a length of the reinforcing plate portion, which protrudes toward the each of the openings outward in the spoke widthwise direction, becoming smaller toward the proximal end side of the each of the plurality of spoke portions, wherein two of the spoke projecting threads arranged side by side on the both sides of the center groove bottom portion are formed so as to approach each other toward the distal end side of the each of the plurality of spoke portions, wherein the each of the spoke projecting threads comprises:
  an inner curved surface portion bent to the wheel axially front side from an end of the center groove bottom portion in the spoke widthwise direction so as to incline upward; and
  an outer curved surface portion formed continuously with the inner curved surface portion so as to incline downward to a wheel axially back side,
  the each of the spoke projecting threads being curved and formed by the inner curved surface portion and the outer curved surface portion so that the cross-section thereof in the spoke widthwise direction projects to the wheel axially front side in the mountain shape, wherein the outer curved surface portion is cut out on the proximal end side of the each of the plurality of spoke portions, and wherein each of the spoke projecting thread coupling portions couples together the inner curved surface portion of one of the spoke projecting threads and the inner curved surface portion of another one of the spoke projecting threads.

12. An automobile wheel according to claim 11,
wherein the outer curved surface portion comprises a cutout formed by cutting out a side edge of the outer curved surface portion so as to become wider toward the proximal end side of the each of the plurality of spoke portions, and
wherein the reinforcing plate portion is formed so as to protrude toward the each of the openings outward in the spoke widthwise direction from the side edge of the outer curved surface portion, which is positioned on the distal end side including no cutout.

* * * * *